(12) United States Patent
Wegner et al.

(10) Patent No.: US 12,497,957 B2
(45) Date of Patent: Dec. 16, 2025

(54) PRE-PRESSURIZED SYSTEM WITH REVERSE ROTATION OF PUMP FOR VALVE ACTUATION

(71) Applicant: Stackpole International Engineered Products, Ltd., Ancaster (CA)

(72) Inventors: Stephan Wegner, Aachen (DE); Ulrich Wienecke, Aachen (DE)

(73) Assignee: Johnson Electric Motion Technology Canada Ltd., Vancouver (CA)

( * ) Notice: Subject to any disclaimer, the term of this patent is extended or adjusted under 35 U.S.C. 154(b) by 339 days.

(21) Appl. No.: 18/165,430

(22) Filed: Feb. 7, 2023

(65) Prior Publication Data

US 2024/0051367 A1    Feb. 15, 2024

Related U.S. Application Data (60) Provisional application No. 63/307,692, filed on Feb. 8, 2022.

(51) Int. Cl.
*F04B 23/02* (2006.01)
*F04C 14/04* (2006.01)
(Continued)

(52) U.S. Cl.
CPC ............ *F04B 23/021* (2013.01); *F04C 14/04* (2013.01); *F04C 14/26* (2013.01); *F04C 28/04* (2013.01); *F04C 28/26* (2013.01); *F15B 1/26* (2013.01)

(58) Field of Classification Search
CPC ........ F04B 23/021; F04C 14/04; F04C 14/26; F04C 28/04; F04C 28/26; F15B 1/26
See application file for complete search history.

(56) References Cited

U.S. PATENT DOCUMENTS 6,422,127 B1   7/2002   Huber et al.
6,948,580 B2   9/2005   Scholten et al.
(Continued)

FOREIGN PATENT DOCUMENTS

DE    102014011549 A1    4/2015
DE    102017117658 B4    6/2021
(Continued)

OTHER PUBLICATIONS

International Preliminary Report on Patentability dated Aug. 6, 2024, issued in corresponding International Application No. PCT/IB2023/051082 (6 pgs.).
(Continued)

*Primary Examiner* — Christopher S Bobish
(74) *Attorney, Agent, or Firm* — Pillsbury Winthrop Shaw Pittman, LLP (57) ABSTRACT

A hydraulic-mechatronic system, for a vehicle that is connected to a target system, includes a housing with a fluid reservoir containing fluid, a communication port, a hydraulic pump, an electric motor for driving the hydraulic pump, at least one check valve, and a relief valve fluidly connected to the target system and the fluid reservoir. The relief valve moves between a first valve position, which is inactive and directs fluid to the communication port, and at least a second valve position, which is active and directs fluid from the communication port to the fluid reservoir. The hydraulic pump may rotate in forward and reverse directions. During operation of the hydraulic pump in the reverse direction, the relief valve is active such that the hydraulic-mechatronic system limits delivery of fluid through the communication port and instead directs fluid flow into the fluid reservoir of the housing.

20 Claims, 8 Drawing Sheets

(51) Int. Cl.
  *F04C 14/26* (2006.01)
  *F04C 28/04* (2006.01)
  *F04C 28/26* (2006.01)
  *F15B 1/26* (2006.01)

(56) References Cited

U.S. PATENT DOCUMENTS

| | | | |
|---|---|---|---|
| 7,051,526 B2 | 5/2006 | Geiger | |
| 7,249,458 B2* | 7/2007 | Arbel | F15B 15/18 |
| | | | 60/473 |
| 7,788,918 B2* | 9/2010 | Huber | F15B 11/08 |
| | | | 60/475 |
| 8,607,559 B2* | 12/2013 | Dybing | F15B 11/0423 |
| | | | 60/463 |
| 8,776,961 B2 | 7/2014 | Mori et al. | |
| 9,879,744 B2 | 1/2018 | Haller | |
| 10,160,282 B2* | 12/2018 | Seminara | B60G 17/0272 |
| 10,582,641 B2* | 3/2020 | Harrington | G06F 1/206 |
| 10,859,100 B2* | 12/2020 | Schaber | F15B 11/022 |
| 10,920,772 B2* | 2/2021 | Harrington | F04C 2/18 |
| 10,927,856 B2* | 2/2021 | Imam | F15B 7/006 |
| 11,072,220 B2* | 7/2021 | Conti | B60G 15/06 |
| 11,193,507 B2* | 12/2021 | Vacca | F15B 7/006 |
| 11,667,172 B2* | 6/2023 | Benevelli | B60G 17/048 |
| | | | 701/37 |
| 2010/0193714 A1 | 8/2010 | Hankinson et al. | |
| 2011/0154816 A1* | 6/2011 | Dybing | F15B 11/0423 |
| | | | 60/459 |

FOREIGN PATENT DOCUMENTS

| | | |
|---|---|---|
| DE | 102020107544 A1 | 9/2021 |
| JP | 2015-102101 A | 6/2015 |
| KR | 10-1982267 B1 | 5/2019 |

OTHER PUBLICATIONS

International Search Report and Written Opinion of the International Searching Authority dated Jun. 28, 2023, issued in corresponding International Application No. PCT/IB2023/051082 (9 pgs.).

Ray I Scroggins, "Back to Basics: Accumulators", Apr. 24, 2020 (printed Jul. 31, 2021), https://www.hydraulicspneumatics.com/technologies/accumulators/article/21129689/back-to-basics-accumulators (14 pgs.).

* cited by examiner

FIG. 8

PRE-PRESSURIZED SYSTEM WITH REVERSE ROTATION OF PUMP FOR VALVE ACTUATION

CROSS-REFERENCE TO RELATED APPLICATIONS

This application claims priority to U.S. Provisional Patent Application No. 63/307,692, filed Feb. 8, 2023, which is hereby incorporated by reference herein in its entirety.

BACKGROUND

Field

The present disclosure is generally related to a hydraulic-mechatronic system that varies a direction of rotation of a pump during operation to compensate for a pressure differential and activate a relief valve.

Description of Related Art

Pumps are utilized in a number of different types of systems for driving an actuator and/or actuating valves. Typically, pumps are provided by a manufacturer and installed as part of a system wherein a pump, a motor, valve(s), and other operating parts are provided by manufacturers—sometimes different ones—and connected for a particular application, i.e., connected to a customer system that requires actuation.

Further, pumps are typically configured to rotate in a particular direction or manner in order to provide pressurized lubricant to activate the valve and/or the customer system.

SUMMARY

It is an aspect of this disclosure to provide a hydraulic-mechatronic system for a vehicle that is connected to a target system. The hydraulic-mechatronic system includes: a housing having a fluid reservoir for containing fluid therein and a communication port provided on the housing for fluid communication with the target system to and from the fluid reservoir. The housing further contains: a hydraulic pump having an inlet and an outlet, the inlet for receiving input fluid from the fluid reservoir and the outlet for providing pressurized fluid to the communication port; an electric motor for driving the hydraulic pump; at least one check valve for selectively providing communication between the fluid reservoir and the hydraulic pump; and a relief valve fluidly connected to the target system and the fluid reservoir. The relief valve is configured for movement between a first valve position and a second valve position. In the first valve position, the relief valve is inactive and configured to direct any fluid to the communication port. In the second valve position, the relief valve is active and configured to direct any fluid from the communication port to the fluid reservoir within the housing. The hydraulic pump is configured for rotation in a forward direction and in a reverse direction. During operation of the hydraulic pump in the reverse direction, the relief valve is active such that the hydraulic-mechatronic system limits delivery of fluid through the communication port and instead directs fluid flow into the fluid reservoir of the housing.

Another aspect includes a method of operating the aforementioned system, which includes: selectively rotating the hydraulic pump in the forward direction, thereby: feeding fluid from the fluid reservoir into the inlet of the hydraulic pump for pressurization; blocking with the relief valve fluid communication to the fluid reservoir; and outputting pressurized fluid from the hydraulic pump through the outlet to the communication port and thus to the target system; and selectively rotating the hydraulic pump in the reverse direction, thereby: feeding fluid from the fluid reservoir into the outlet of the hydraulic pump; limiting delivery of fluid through the communication port; and directing fluid flow from the communication port into the fluid reservoir via the relief valve.

Other features and advantages of the present disclosure will become apparent from the following detailed description, the accompanying drawings, and the appended claims.

DETAILED DESCRIPTION OF THE PREFERRED EMBODIMENT(S)

The system disclosed herein is a hydraulic-mechatronic system that contains a number of operating parts in a single housing containing fluid therein. Further, a method for controlling and operating those parts is provided herein, including operating the enclosed pump in a reverse direction, to compensate for pressure differential between the system and the customer system (or target system).

In this disclosure, a "target system" refers to a system, device, or actuator configured to receive pressurized fluid therein. The terms "customer system" and "target system" may be used interchangeably herein. In accordance with an embodiment, which is used in the illustrative embodiments of the Figures, the target system may on one application be a suspension levelling system in a vehicle, but it may be used for other applications. That is, the disclosed hydraulic-mechatronic system 100—also referred to herein as a Motor Pump Unit (MPU), or MPU 100—may be connected to a shock absorber(s) 20 as the target system which may be selectively pressurized and/or de-pressurized. Such a suspension levelling system is only intended to be an example of several types of target systems which may be connected to the disclosed hydraulic-mechatronic system, however. The illustrative example is not intended to limit the scope, use, or operation of the herein disclosed system in any way.

As understood by one skilled in the art, the fluid in a pump system, like the one that is disclosed herein, may be utilized for lubrication and/or for pressurized hydraulic purposes. Accordingly, the terms fluid, hydraulic fluid, and lubricant may be used interchangeably throughout this disclosure, and thus it should be understood that such terms are not intended to be limiting.

Figure 1:
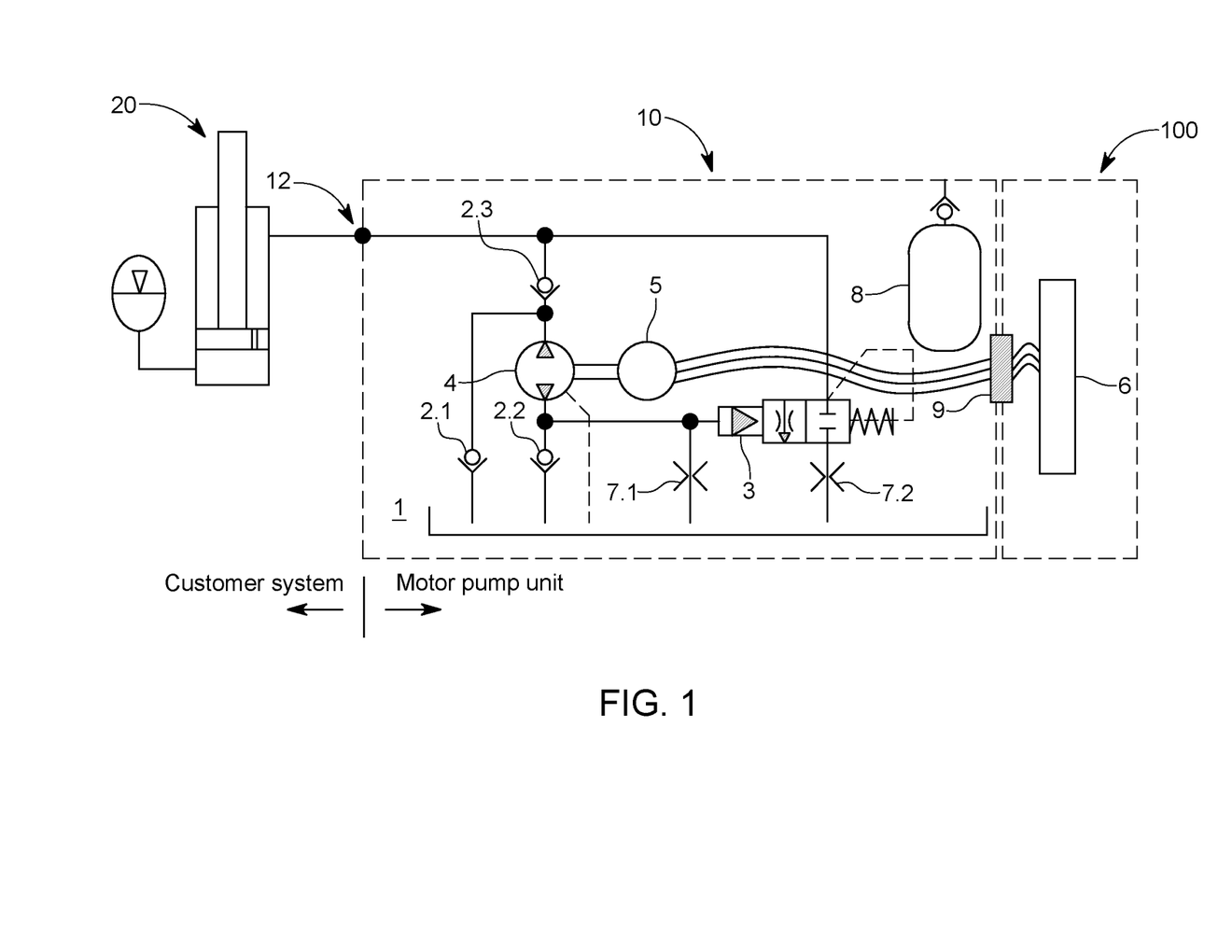
FIG. 1 shows a schematic drawing of a motor pump unit (MPU) in accordance with an embodiment of the present disclosure, connected to a target system.

The MPU 100 in the non-limiting embodiment is a closed system containing a set amount of fluid to be pumped (e.g., oil or another hydraulic fluid in the automotive context) to and from a fluid reservoir 1 contained by a housing 10 or enclosure. The housing 10 includes a number of operating parts therein, as described below. The MPU 100 includes a communication port 12 for communicating fluid to/from the fluid reservoir 1 with respect to a target system 20, i.e., a system that utilizes fluid and/or lubrication. In the Figures, the target system 20 refers to a shock absorber which is connected to a hydraulic motor, that is part of a suspension system, designed to change (i.e., increase and decrease) pressure in the target system. The connection of the communication port 12 to the target system 20 is schematic, as shown. For example, a person of ordinary skill in the art would understand that, in accordance with an embodiment, the fluid may be delivered or withdrawn to change the pressure to actuate or de-activate the system 20. In some embodiments, the pressure may be increased on both the tops and bottom of the piston, with the resulting force originating from the area difference between the top and bottom surface. This is not limiting, and any increase or decrease of pressure for affecting movement may be used, FIG. 1 illustrates, schematically, exemplary and non-limiting features of the MPU 100 that are included within the housing 10 in accordance with an embodiment. Such features include the aforementioned fluid reservoir 1, a hydraulic pump 4, an electric motor 5, a controller 6, a relief valve 3 and check valve(s), as well as at least one fixed orifice that form a hydraulic circuit for operating the target system 20. In addition, the housing 10 may include, in accordance with a particular embodiment, a volume compensation device 8 in the fluid reservoir 1 for pre-pressurizing the fluid reservoir 1 and for providing optional volume compensation of the system, as needed. In such a case, the MPU 100 may be considered a closed system that includes its own compensator therein. Fluid is designed to fill the space within the fluid reservoir 1 all around the motor 5 and volume compensation device 8. The volume compensation device 8 may be a gas expansion bag, although other devices may be used. As pressure increases inside the housing, the device 8 is compressed to allow for more volume and, conversely, as the pressure decreases the device 8 expands to take-up volume. The schematic is not intended to illustrate the specific structural design. For example, although the reservoir 1 in the schematic is depicted separately below the pump 4 and associated structures, that depicts the hydraulic circuit layout and in the physical design the reservoir may be a placed in any location, including a cavity that surrounds and includes the pump 4 and other associated structures. In an embodiment, the housing may include the volume compensation device 8 enclosed therein. In another embodiment, the housing may be vented to the atmosphere or environment, or another attached compensation device or system. For example, in accordance with an embodiment, volume compensation may be realized by simply connecting the reservoir 1 to the atmosphere and allow air to compensate for the volume change, i.e., without use of a particular device (within or connected to MPU) for changing volume within the reservoir.

The hydraulic pump 4 has an inlet and an outlet. Generally, during regular operation wherein the pump 4 is supplying fluid to the target system 20 and the pump 4 is subjected to forward rotation, the pump inlet receives input fluid from the fluid reservoir 1 via an inlet path and the outlet provides pressurized fluid to the communication port 12 via an outlet path, and thus to the target system 20. In accordance with embodiments, described later below, the pump 4 is also configured to supply fluid to the relief valve 3 when selectively operated in an opposite direction, i.e., in reverse rotation, to provide fluid from the target system 20 and into the housing 10. More specifically, the target system 20 pushes fluid into the housing 10/MPU 100 in reverse rotation, relying on a higher pressure in the target system 20 as compared to that of the MPU 100. As such, when in reverse operation, the outlet of the hydraulic pump 4 becomes an input for fluid, and the inlet becomes an output. For convenience, the inlet and outlet will be referred to based on their respective roles in the forward direction of the pump 4, unless otherwise noted.

Electric motor 5 is provided as a power source for driving the hydraulic pump 4 and is connected or attached thereto. The controller 6 controls operation of the electric motor 5, and thus the hydraulic pump 4.

In an embodiment, the hydraulic pump 4 is an external gear type pump, but it may be any type of pump for delivering fluid, such as internal gear pumps, vane pumps, gerotor pumps, etc.

The controller 6 is contained in the housing yet separated from the fluid in the fluid reservoir 1 by way of a seal or sealed connection 9 between the controller 6 and the electric motor 5. The controller 6 may be a printed circuit board (PCB) that is placed within a walled portion of the housing 10. In other embodiments, the controller may be included in the housing, and for example may be in a sealed chamber or housing mounted inside it.

In accordance with an embodiment, the hydraulic pump 4 is configured for rotation in a forward direction and in a reverse direction, using the electric motor 5 and the controller 6, i.e., the controller 6 may command the motor 5 to rotate the pump 4 in a specific direction. The MPU 100 may transfer fluid into the target system 20 when the pump is driven in the forward direction. Further, besides sensing requirements to operate the hydraulic pump 4 (e.g., start or stop) to pump and supply pressurized fluid to the target system 20, the controller 6 may be designed to sense and control rotation of the pump 4 in the reverse or opposite direction, via the motor 5, in accordance with an embodiment. For example, the MPU 100 may transfer fluid into the target system 20 or vice versa, depending on if volume compensation may be required. Relief valve 3 is utilized to bleed pressure out of/from the target system 20 (e.g., the shock absorber) and compensate for the pressure differential between the target system 20 and MPU 100. Specifically, the relief valve 3 may be configured to be hydraulically actuated to balance the pressure in the target system 20 and fluid reservoir 1, in accordance with some embodiment. In other embodiment, the relief valve 3 may be controlled in the forward and/or reverse direction(s) of the hydraulic pump 4 in order to move fluid in any number of states and/or stop fluid flow (e.g., stop pressurizing in the forward direction by stopping the motor; stop dumping of fluid in the reverse direction). In some embodiments, the controller does not need to do this in response to sensing, and the decision to deliver pressure to or remove pressure from the target system may be driven by other inputs (e.g., a user input to raise or lower the piston, or a command from a processor in the vehicle or other system).

The type of relief valve 3 used in the MPU 100 is not intended to be limiting. In an embodiment, a spool valve may be utilized, such as depicted in FIGS. 1-4. In another embodiment, a relievable check valve with a poppet or ball and piston therein may be used, such as depicted in the embodiment of FIGS. 5-8. For example, the relief valve 3 may be designed to actuate a piston, which sits below the poppet/ball which pushes it out of the seat and therefore opens the valve. In an embodiment, the piston may be actuated based on a particular ratio between the opening pressure and the active pressure, closing the valve. Generally, such valves and features are understood by those of ordinary skill in the art and thus are not further described here. In addition, the location of the relief valve 3 within the fluid circuit may be altered, e.g., relative to valve 7.2, as noted later below.

Figure 2:
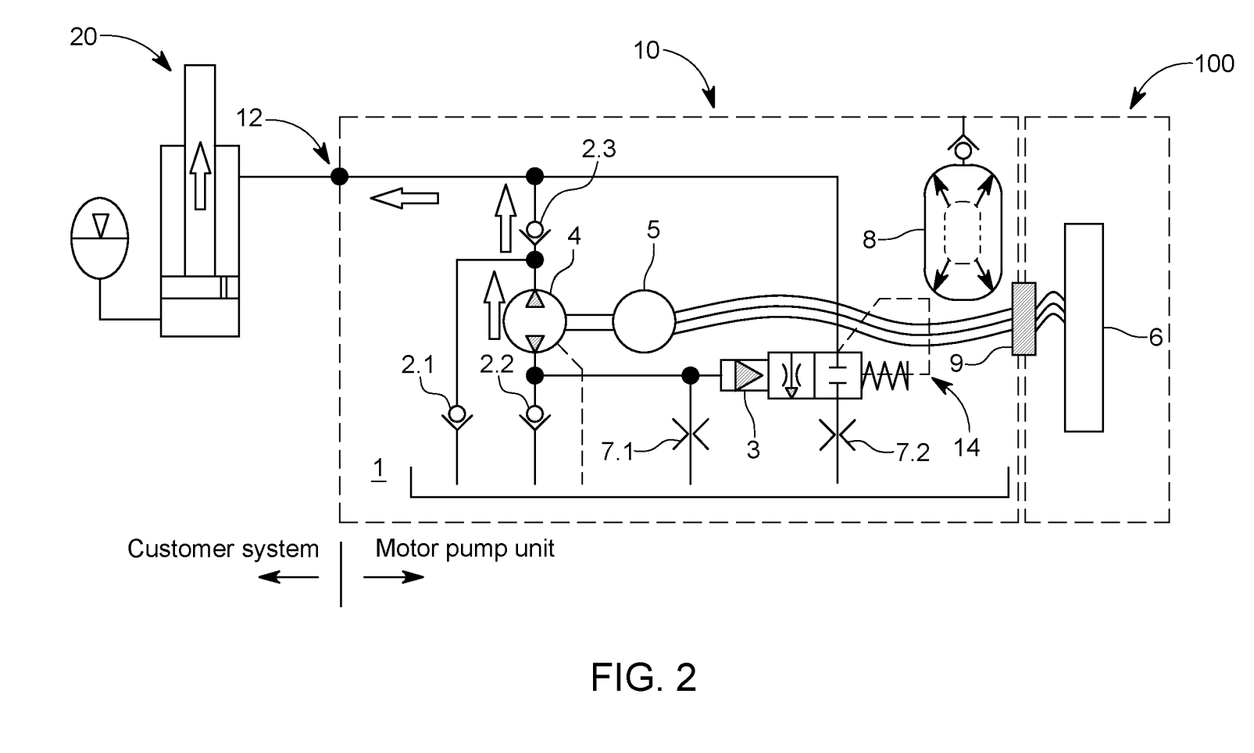
FIG. 2 shows a first mode of operation of the MPU in accordance with an embodiment.
Figure 3:
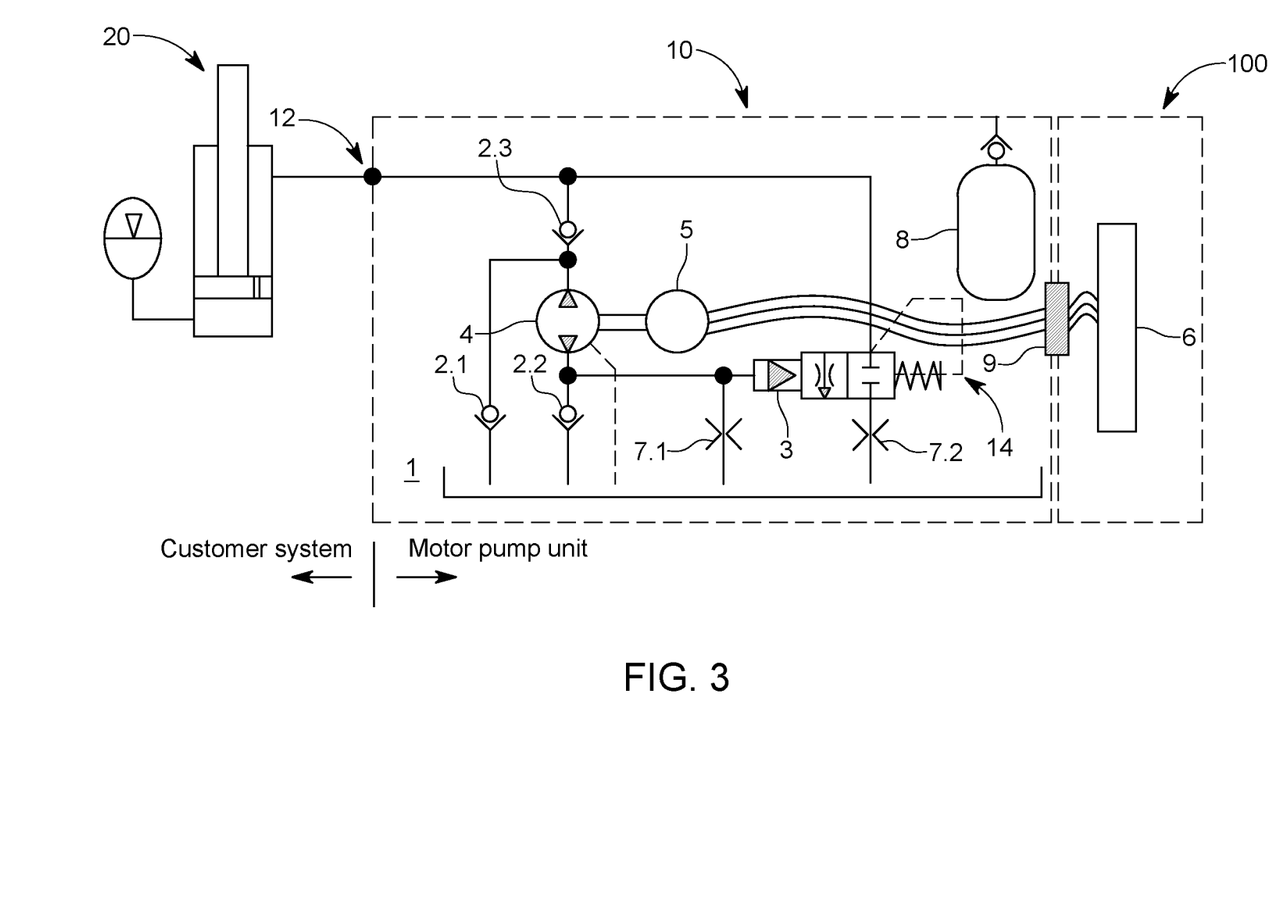
FIG. 3 shows a portion of the hydraulic circuit that is utilized in the MPU in accordance with an embodiment.
Figure 4:
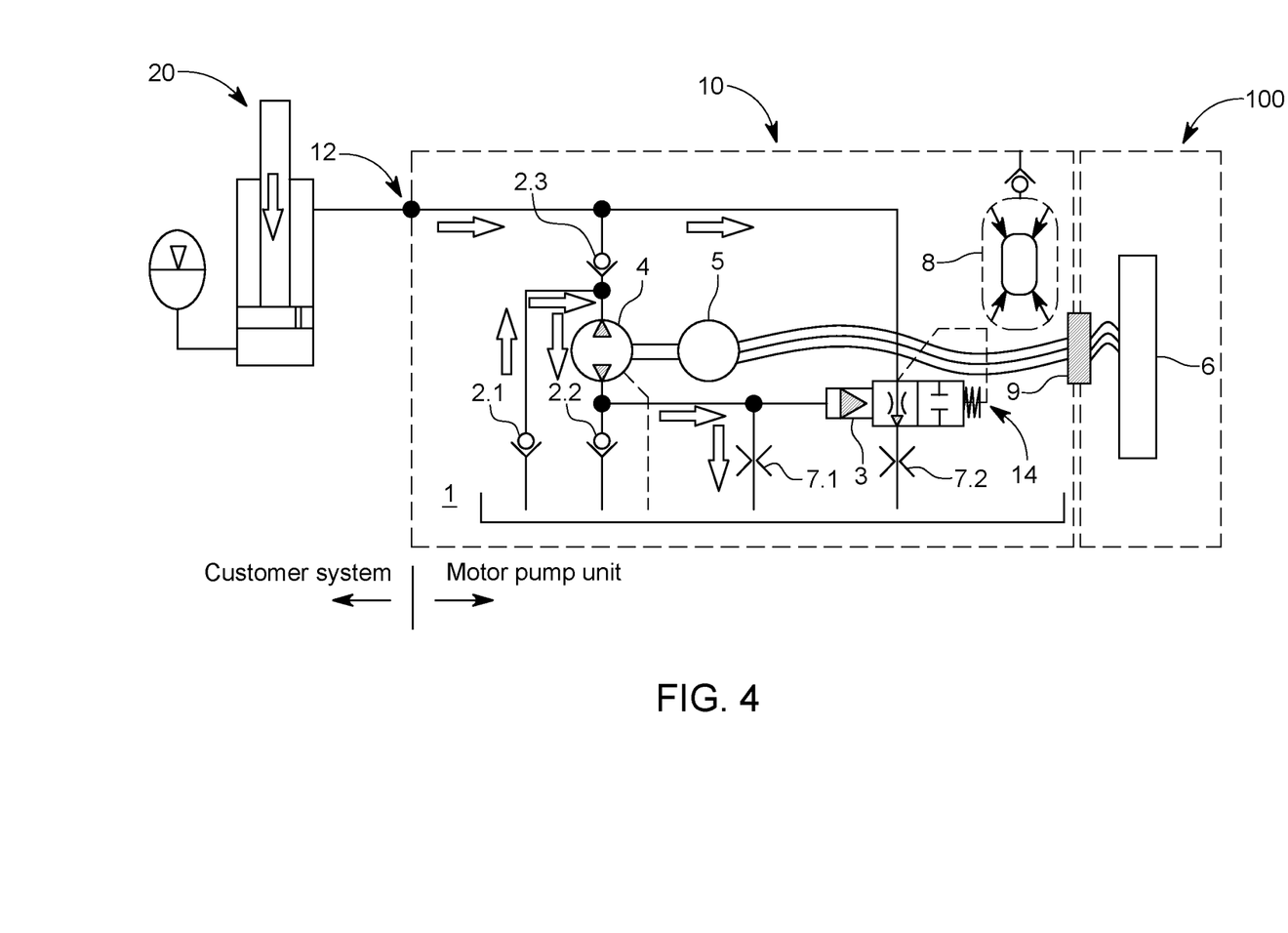
FIG. 4 shows a second mode of operation of the MPU in accordance with an embodiment.

As shown schematically in FIG. 1, for example, the relief valve 3 is fluidly connected to the communication port 12 and the target system 20 via a path. The relief valve 3 is configured for movement between a first valve position and at least a second valve position, based on the direction in which the pump 4 is driven. In accordance with an embodiment, the relief valve 3 may be a proportional valve that has not only first and second (closed and open) positions, but also one or more positions in between, or greater than the second valve position. A spring or similar biasing component is used to bias the relief valve 3 into a first valve position, in accordance with an embodiment. FIG. 4 highlights the path in the hydraulic circuit that is used to control the position of the relief valve 3. In the first valve position, the relief valve 3 is inactive (or closed) and configured to direct any fluid to the communication port 12, such as shown in FIG. 2 and FIG. 3. In the illustrated embodiment, the path to the communication port 12 is common or shared by both the pump 4 and the valve 3, and thus when the relief valve 3 is in the first position that prevents any fluid delivered from the pump 4 from being diverted back into the reservoir through the relief valve 3. In the second valve position, the relief valve 3 is active (or opened) and configured to direct any fluid from the communication port 12 to the fluid reservoir 1 within the housing 10, such as shown in FIG. 4. This relieves pressure from the target system 20 by moving a volume of fluid from the target system to the reservoir 1.

Generally, it should be understood by one of ordinary skill in the art that the second valve position of the relief valve 3 is not intended to refer to a set position, but rather a position that is not closed. Accordingly, movement of the relief valve 3 to a second position refers to opening the valve such that fluid flow is permitted through the valve (e.g., from the communication port and connecting path) and to the fluid reservoir. The amount of flow that the relief valve 3 permits to the fluid reservoir 1 in the second valve position (i.e., the open position) may vary and be based on the amount of fluid pressure applied thereto, and thus is not intended to be limiting. As an example, such positions may be based on a fluid flow and/or pressure provided to the relief valve 3 during rotation of the hydraulic pump 4. As a non-limiting example, the first valve position may be a closed position, the second valve position may be a fully open position that allows for fluid flow, and a third position in between may be a partially open position that allows for fluid flow in a selective manner.

As shown in FIG. 3, the path in the hydraulic circuit that controls the relief valve 3 is communicated to the inlet side of the pump 4. When the pump 4 is run in the reverse direction, as shown in FIG. 4, it draws fluid from the reservoir 1 via a check valve 2.1, and delivers that fluid at least in part to the relief valve 3 so as to urge the relief valve from the first position to the second position. The pump 4 also delivers that fluid back to the reservoir 1 via a restriction orifice 7.1, but because of the restriction sufficient pressure will build up to displace the valve 3 to the second position. As such, in accordance with an embodiment, during operation of the hydraulic pump 4 in the reverse direction, the relief valve 3 is active such that the system directs fluid flow into the fluid reservoir 1 of the housing 10 from the target system 20 to relieve pressure therefrom.

Accordingly, by reversing the rotational direction of the hydraulic pump 4, fluid pressure is instead directed to the relief valve 3 through a flow path, resulting in activation of the relief valve 3 and thus no fluid delivery from the MPU 100.

In addition to the aforementioned features, the hydraulic circuit may include one or more check valves and one or more fixed orifices which are used in combination with reversing the rotational direction of the hydraulic pump 4 when applying the actuation pressure on the relief valve 3. By varying the pressure on the relief valve 3, any number of switching and continuous valves may be controlled. Varying the pressure using a fixed orifice, for example, can be realized by varying the speed of the pump 4.

In accordance with an embodiment, at least one check valve is provided in the MPU 100 for selectively providing communication between the fluid reservoir 1 and the hydraulic pump 4. In the exemplary illustrated embodiment of the Figures, a first check valve 2.1 and a second check valve 2.2 are provided for selectively providing communication between the fluid reservoir 1 and the hydraulic pump 4. The first check valve 2.1 may be called an outlet check valve for convenience because it communicates the reservoir 1 with the pump outlet (i.e. the outlet in the pump's forward direction) and the second check valve 2.2 may be called an inlet check valve because it communicates the reservoir 1 with the pump inlet (again referring to the pump's forward direction). These valves 2.1 and 2.2 may also be referred to as reservoir check valves because they communicate with the reservoir 1. In an embodiment, the first check valve 2.1 is used for fluid delivery from the reservoir 1 during reverse rotation/operation of the pump 4 and the second check valve 2.2 is used for fluid delivery from the reservoir 1 during forward rotation/operation of the pump 4. Specifically, the first check valve 2.1 blocks fluid flow from the pump outlet to the reservoir 1, but permits fluid flow from the reservoir 1 to the pump outlet. Thus, when the pump 4 runs in its forward direction, that valve 2.1 blocks flow to the reservoir 1 so that flow is directed to the outlet path and communication port 12 (see FIG. 2). But when the pump runs in the reverse direction, as depicted in FIG. 4, that valve 2.1 permits fluid to be drawn from the reservoir 1 into the outlet of the pump 4. Likewise, as shown in FIG. 2, the second check valve 2.2 blocks fluid flow from the pump inlet path to the reservoir 1, but permits fluid flow from the reservoir 1 to the inlet path and pump inlet. Thus, when the pump runs in its forward direction, that valve 2.2 permits fluid to be drawn from the reservoir 1 via the inlet path into the pump inlet of the pump 4. But when the pump runs in its reverse direction, that valve 2.2 blocks fluid in the inlet path that is output from the pump 4 from going directly to the reservoir 1 (which ensures that such flow may be used to activate valve 3), as shown in FIG. 4.

In an embodiment, an outlet or outlet path check valve 2.3 is provided in an outlet path that is connected to the outlet of the hydraulic pump 4 and the communication port 12. The check valve 2.3 blocks fluid from the outlet path to the pump outlet, but permits fluid flow from the pump outlet to the outlet path. Thus, when the pump 4 runs in its forward direction, the valve 2.3 permits flow to the outlet path and communication port 12, as depicted in FIG. 2. But when the pump runs in the reverse direction (or is not running), as shown in FIG. 4, the check valve 2.3 blocks fluid in the outlet path from passing the check valve 2.3 and entering the pump 4.

The type of valves 2.1, 2.2, and/or 2.3 used in the MPU 100 is not intended to be limiting. In an embodiment, a relievable check valve with a poppet or ball and piston therein may be used. A spring may optionally be utilized with such valves 2.1, 2.2, and/or 2.3 may be designed to actuate a piston, which sits below the poppet/ball which pushes it out of the seat and therefore opens the valve. Generally, such valves and features are understood by those of ordinary skill in the art and thus are not further described here.

In accordance with an embodiment, at least one fixed metering orifice is provided in the MPU 100 which is configured to meter fluid with respect to the fluid reservoir 1. In the exemplary illustrated embodiment of the Figures, which is not intended to be limiting, a first fixed metering orifice 7.1 and a second fixed metering orifice 7.2 are provided. The first fixed metering orifice 7.1 is used for reverse operation of the hydraulic pump 4 and is a restriction for fluid flow into the reservoir 1. When the hydraulic pump 4 is rotating in forward direction it draws fluid from the reservoir 1 via check valve 2.2 and orifice 7.1. Fluid is pumped from the reservoir 1 to the target system 20. Thus, when the pump is running in reverse, as shown in FIG. 4, because the restriction 7.1 limits the flow back into the reservoir 1 (and valve 2.2 prevents flow therethrough back to the reservoir), the (remaining) flow that does not pass through restriction 7.1 may build pressure in order to also push the relief valve 3 against the spring, which activates the valve to its second valve position so the fluid from the communication port 12 (received from the target system 20) may flow into the reservoir 1.

In an embodiment, the first fixed metering orifice 7.1 may be positioned between a flow path that is between the pump 4 and the relief valve 3 (and used during reverse rotation) and the reservoir 1, such as shown in FIGS. 1-4.

The second fixed metering orifice 7.2 is optionally used to limit the pressure bleed rate from the target system 20 through the relief valve 3 and into the reservoir 1, when the valve 3 is open in its second position. This results in passively limiting or dampening the rate at which the pressure drops when the valve 3 is open/activated to its second valve position.

In an embodiment, the second fixed metering orifice 7.2 may be positioned between the valve 3 and the reservoir 1, i.e., behind the valve 3, such as shown in the embodiment of FIGS. 1-4. In another embodiment, the second fixed metering orifice 7.2 may be positioned before the valve 3, i.e., between the target system 20/communication port 12 and the relief valve 3, such as shown in the embodiment of FIGS. 5-8. Placement as shown in FIGS. 5-8 may help limit or prevent pressure build up within the relief valve 3. No matter the placement of the metering orifice 7.2, use of such an orifice between the target system 20 and the reservoir 1 in series with the relief valve 3 is designed to influence the flow rate which is returning from the target system 20 to the reservoir 1.

Further, in accordance with some embodiments, the relief valve 3 includes an optional connection loop or connection path 14, which is depicted in at least FIGS. 3 and 4. Inclusion of such a loop 14 may be dependent on the type of valve used for relief valve 3 within the MPU 100. Specifically, this connection loop 14 may be designed to be active at all times and fluidly connect the line from the communication port 12 (received from the target system 20) to the end of the spool inside the valve, i.e., to the end at which a spring or similar biasing component is used to bias the relief valve 3 into its first valve position (or closed position). This fluid line connection via loop/path 14 results in biasing the valve 3 towards the closed position when the pump 4 runs in its forward direction, i.e., when the target system 20 (e.g., shock absorber) is pressurized, such as shown in FIG. 2. On the other hand, when the pump is running in reverse, as shown in FIG. 4, the flow rate from the communication port 12 through the relief valve 3 and into the reservoir 1 is greater than the flow through the connection loop 14, resulting in pushing the relief valve 3 against the spring.

The number of check valves and fixed metering orifices provided in the MPU 100 as illustrated in the figures and described above are not intended to be limiting. Rather, the number (one or more) of valves and orifices may be dependent on requirements of the target system 20 that the MPU 100 is connected to.

As previously mentioned, in particular embodiments, the MPU 100 may include a volume compensation device 8. In one, non-limiting and exemplary embodiment, the volume compensation device 8 may be provided in the form of bladder accumulator or a gas expansion bag. However, use of such a bladder or a bag is not intended to be limiting in any way. The volume compensation device 8 is a passive element that is filled with a compressible gas (e.g., air) and is designed to compensate for a change of fluid in the reservoir 1. The volume compensation device 8 may optionally include a check valve associated therewith. For example, as fluid (e.g., oil) is taken out of or withdrawn from the reservoir 1 and directed or pushed into the target system 20, the volume compensation device 8 is designed to expand and to fill the void within the reservoir, because it is enlarged/expanded/filled with compressed gas. The volume compensation device 8 has a compressible gas inside, so it may be charged once to a desired minimum pressure (e.g., approximately 25 to 75 bar) and the check valve seals it. Once the volume compensation device 8 is charged, the contained gas is expanded or compressed in the volume compensation device 8 as hydraulic fluid is moved within (in and out of) the system (rather than an exchange of gas in and out of the device itself). Accordingly, the volume compensation device 8 is utilized to compensate for a fluid differential (volume differential) with regards to the target system 20. That is, since the MPU 100 is a system with fixed displacement of fluid to/from the target system 20, any fluid delivered to the target system 20 must be compensated. By expanding the volume compensation device 8 during delivery of fluid to the target system 20 (and conversely, compressing the device 8 if fluid is received in the fluid reservoir 1), fluid changes are compensated. The volume compensation device 8 expands and fills the void left by the fluid that has been exchanged, and vice versa. Further, the expansion may be utilized, in accordance with embodiments, to pre-pressurize fluid in the fluid reservoir 1 of the MPU 100 before delivery to the target system 20, so that in the pressure level in equilibrium state (open valve) can be adjusted. The pre-pressurization level of the volume compensation device 8 may be determined by a customer and their requirements related to the target system 20 and use (e.g., weight of a vehicle, suspension design, handling characteristics, spring rate, etc.)

In addition to schematically showing the hydraulic circuit and features of the MPU 100, FIGS. 2 and 4 show methods of operating the MPU 100 and its components. FIG. 2 shows a first mode of operation, in accordance with an embodiment, wherein the pump 4 is operated in a first, forward rotation mode and second check valve 2.2 is open to allow fluid flow from the reservoir 1 and into the inlet path of the pump 4 for pressurization. First check valve 2.1 is closed and prevents bleeding from the outlet path of the pump 4 back to the reservoir so that fluid may be directed to through the check valve 2.3 and through communication port 12. The relief valve 3 is in its closed or first valve position, thus also limiting flow back to the reservoir. When included in the MPU 100, the optional connection loop 14 allows the pressure to be applied from the communication port 12 to the spring end of the spool inside the valve to bias the relief valve 3 into its first valve position. Accordingly, rotating or spinning of the pump 4 in the first/forward direction increases fluid flow to the target system 20.

FIG. 4 shows a second mode of operation of the MPU 100, in accordance with an embodiment. The pump 4 is operated in a second, reverse rotation mode and first check valve 2.1 is open to allow fluid flow from the reservoir 1 and into the outlet path of the pump 4 such that the outlet of the pump 4 is an input. Fluid is output into the inlet path and second check valve 2.2 is closed to prevent flow back into the reservoir 1. Instead, fluid is directed for limited flow through the first fluid metering orifice 7.1 back to the reservoir 1 and towards the relief valve 3, to move it towards is second or open position. The check valve 2.3 blocks fluid flow to the hydraulic pump 4 from the communication port 12. Instead, fluid is directed towards the open relief valve 3, thus allowing flow back to the reservoir 1 from the target system 20. Accordingly, rotating or spinning of the pump 4 in the second/reverse direction relieves fluid flow from the target system 20. Second fluid metering orifice 7.2 is provided in the path from the relief valve 3 to limit flow into the reservoir.

As previously noted, FIGS. 5-8 show an alternative embodiment of a schematic diagram (at the top) and in cross-section (at the bottom) of the MPU 100 that are included within the housing 10. For simplicity purposes, parts previously described with reference to FIGS. 1-4 have been provided with the same reference numerals in FIGS. 5-8, and thus their description may not be fully repeated here; however, it should be noted that the aforementioned description noted with regards to the features shown in FIGS. 1-4 applies to the features shown in FIGS. 5-8. As previously mentioned, in this illustrated embodiment, the relief valve 3 is positioned between the second fixed metering orifice 7.2 and the reservoir 1 to aid in influencing (e.g., limiting) the flow from the target system 20 the reservoir 1. Further, the embodiment of FIGS. 5-8 utilizes a relievable check valve with a poppet or ball and piston therein as the relief valve 3, as well as for the check valves 2.1, 2.2, and 2.3.

Figure 5A:
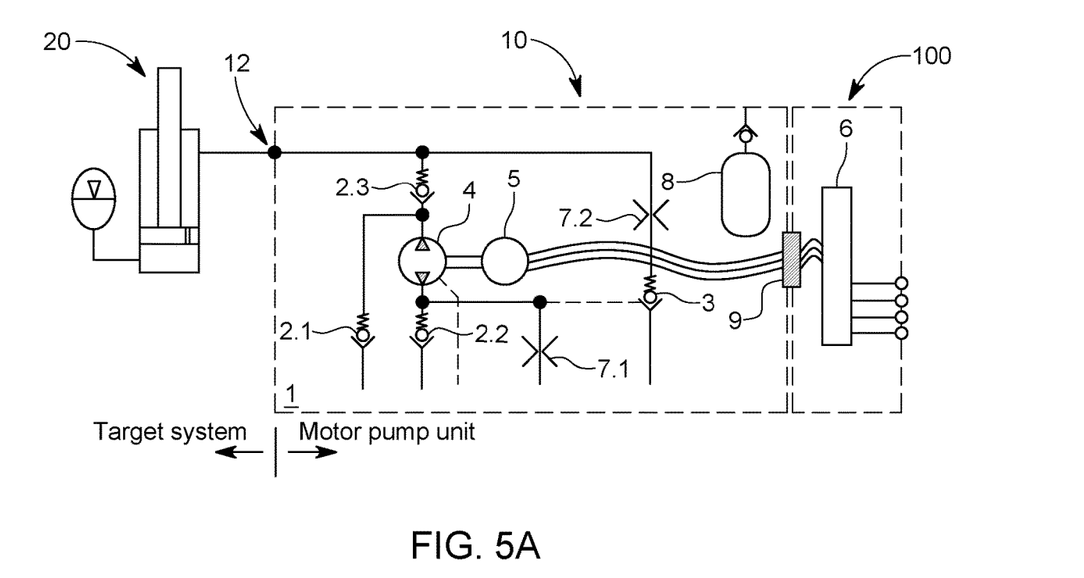
FIGS. 5A and 5B show a schematic drawing (top) and a longitudinal cross section (bottom), respectively, of a motor pump unit (MPU) in accordance with another embodiment of the present disclosure, connected to a target system.
Figure 5B:
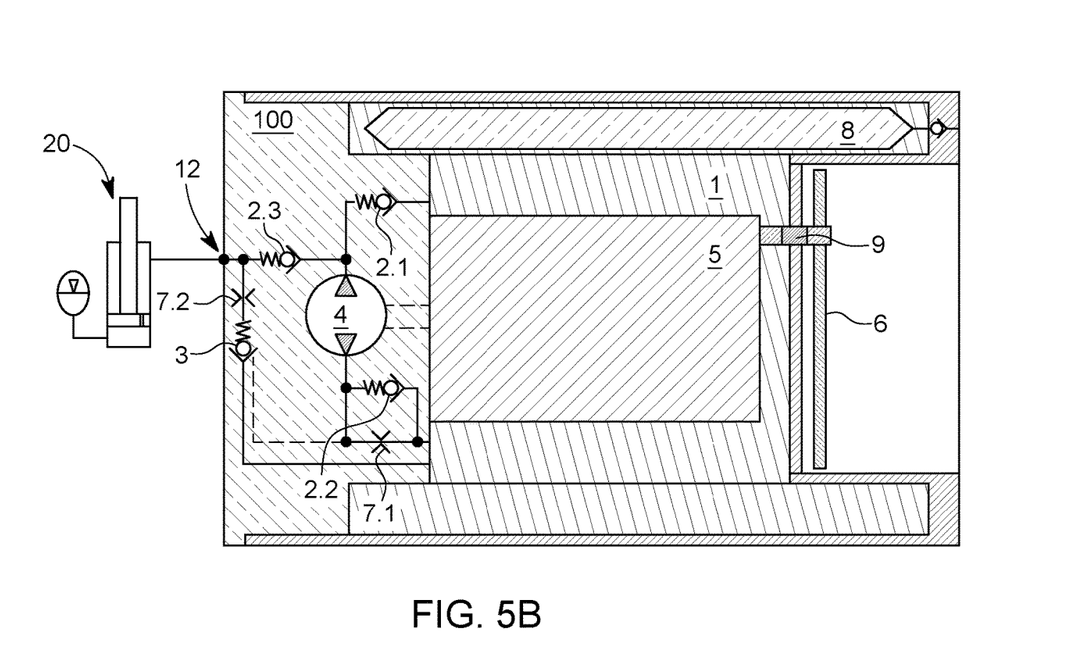
Figure 6:
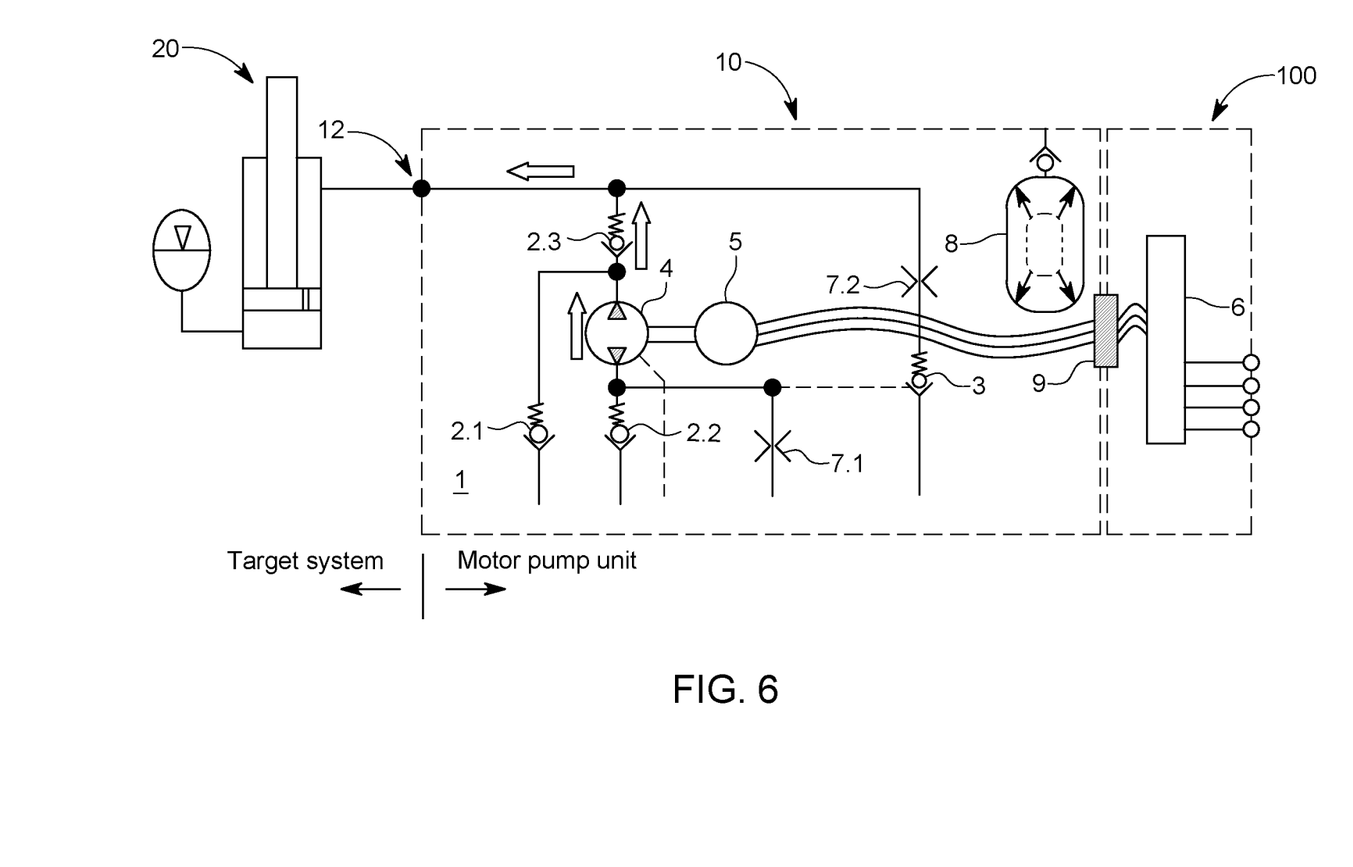
FIG. 6 shows a first mode of operation of the MPU of FIGS. 5A-5B in accordance with an embodiment.
Figure 8:
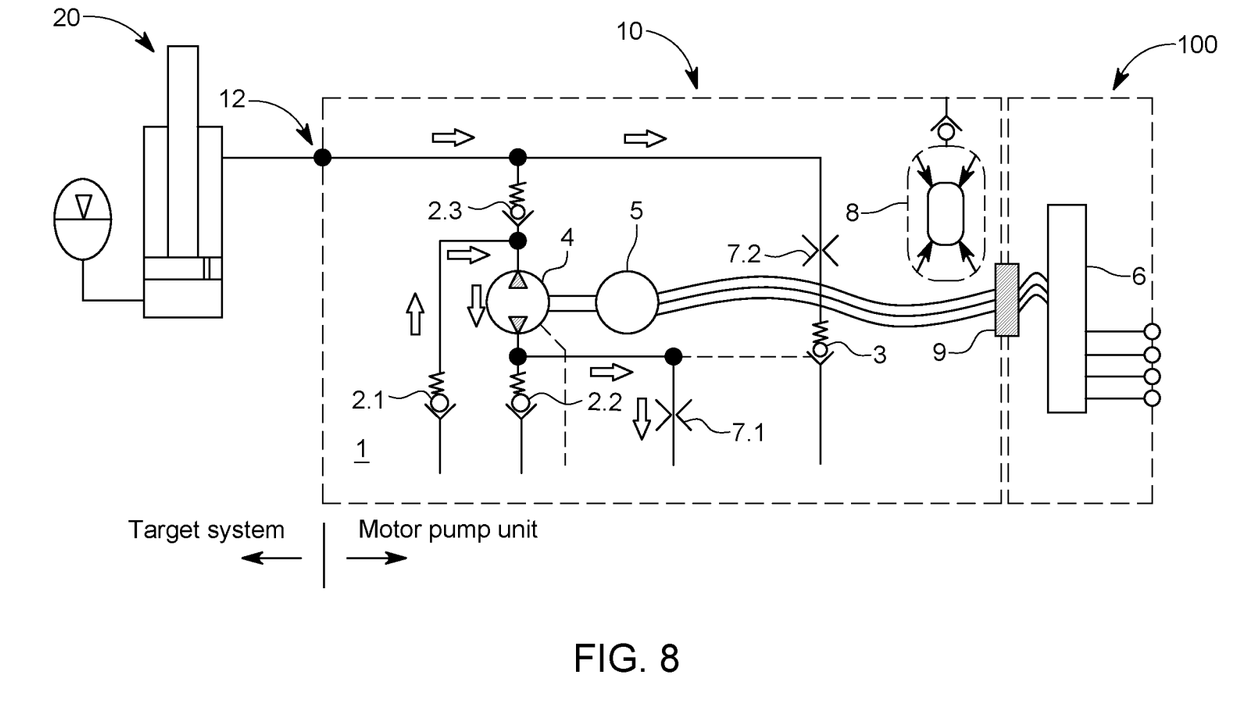
FIG. 8 shows a second mode of operation of the MPU of FIGS. 5A-5B in accordance with an embodiment.

FIGS. 6 and 8 show methods of operating the MPU 100 of FIGS. 5A-5B and its components. FIG. 6 shows a first mode of operation, in accordance with an embodiment, wherein the pump 4 is operated in a first, forward rotation mode and second check valve 2.2 is open to allow fluid flow from the reservoir 1 and into the inlet path of the pump 4 for pressurization. First check valve 2.1 is closed and prevents bleeding from the outlet path of the pump 4 back to the reservoir 1 so that fluid may be directed to through the check valve 2.3 and through communication port 12. The relief valve 3 is in its closed or first valve position, thus also limiting flow back to the reservoir. Accordingly, rotating or spinning of the pump 4 in the first/forward direction increases fluid flow to the target system 20.

Figure 7:
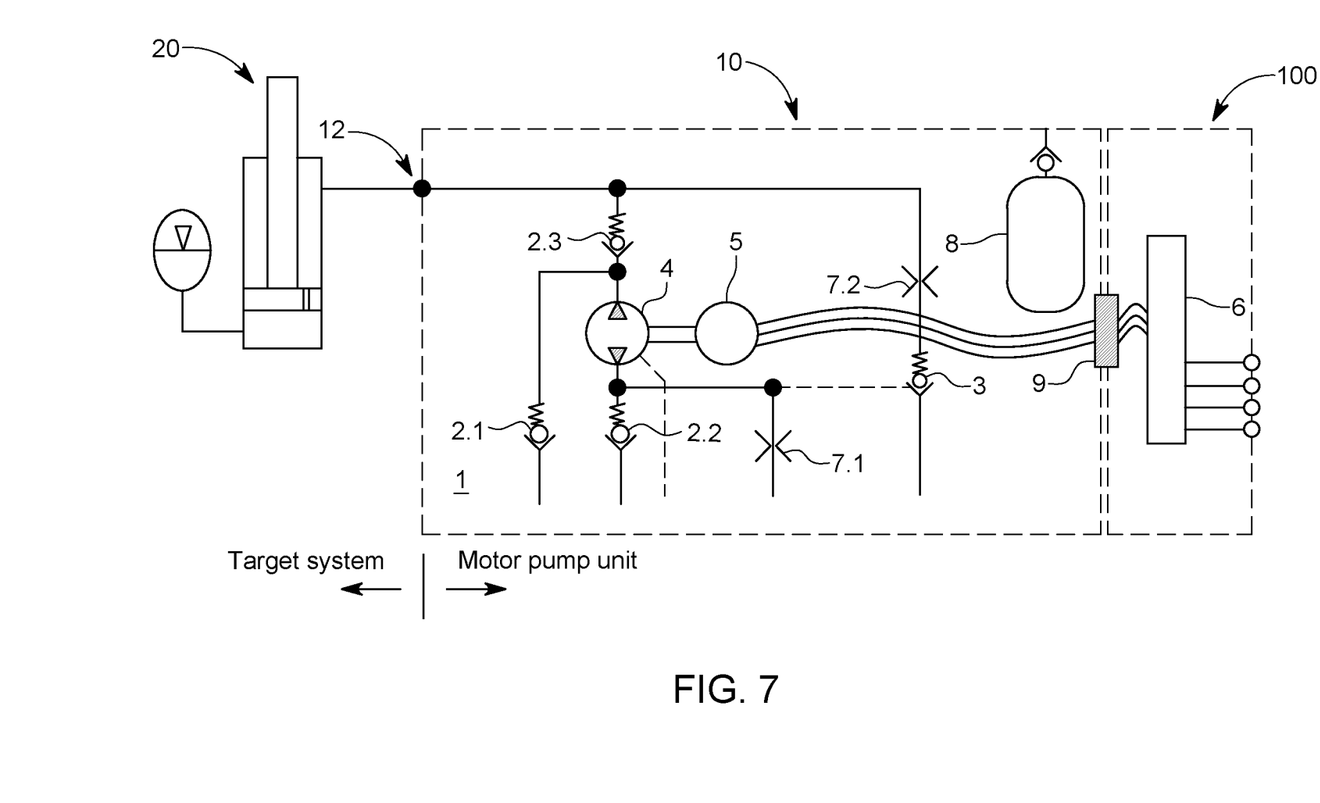
FIG. 7 shows a portion of the hydraulic circuit that is utilized in the MPU of FIGS. 5A-5B in accordance with an embodiment.

As shown in FIG. 7, the path in the hydraulic circuit that controls the relief valve 3 is communicated to the inlet side of the pump 4. When the pump 4 is run in the reverse direction, or a second mode of operation of the MPU 100 as shown in FIG. 8, it draws fluid from the reservoir 1 via a check valve 2.1. That is, pump 4 is operated in a second, reverse rotation mode to allow fluid flow from the reservoir 1 and into the outlet path of the pump 4 such that the outlet of the pump 4 is an input, and delivers that fluid at least in part to the fixed metering orifice 7.2 and relief valve 3. Fluid is output into the inlet path and second check valve 2.2 is closed to prevent flow back into the reservoir 1. Instead, fluid is directed for limited flow through the first fluid metering orifice 7.1 back to the reservoir 1 and towards the relief valve 3, to move it towards is second or open position. Because of the restriction of orifice 7.1, pressure will build in order to displace the relief valve 3 to a second position, or active position. Accordingly, rotating or spinning of the pump 4 in the second/reverse direction relieves fluid flow from the target system 20, and directs fluid into the fluid reservoir 1. The check valve 2.3 blocks fluid flow to the hydraulic pump 4 from the communication port 12. Instead, fluid is directed towards the second fixed metering orifice 7.2, and then to relief valve 3, thus allowing flow back to the reservoir 1 from the target system 20. Second fluid metering orifice 7.2 is provided in the path to limit flow into the relief valve 3. Accordingly, by reversing the rotational direction of the hydraulic pump 4, fluid pressure is instead directed to the relief valve 3 through a flow path, resulting in activation of the relief valve 3 and thus no fluid delivery from the MPU 100.

Accordingly, this disclosure provides a system that is utilized for controlling a target system 20 and contains the operating parts (pump 4, motor 5, valves, etc.) in a housing as a package. In addition to the hydraulic pump 4, motor 5, and relief valve 3 being contained within the fluid reservoir 1, which acts as a pressure vessel, a number of valves and fixed metering orifices are also provided in the housing 10 as part of the MPU 100.

In accordance with an embodiment, the disclosed system or MPU 100 is a closed system, wherein the whole system and its parts—the valves, gas bag, etc.—are all enclosed and sealed such that they are contained in a single housing to form a single unit.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles.

What is claimed is:

1. A hydraulic-mechatronic system for a vehicle that is connected to a target system, the hydraulic-mechatronic system comprising:
   a housing comprising a fluid reservoir for containing fluid therein;

a communication port provided on the housing for fluid communication with the target system to and from the fluid reservoir;

the housing further containing:
- a hydraulic pump having an inlet and an outlet, the inlet for receiving input fluid from the fluid reservoir and the outlet for providing pressurized fluid to the communication port;
- an electric motor for driving the hydraulic pump;
- at least one check valve for selectively providing communication between the fluid reservoir and the hydraulic pump;
- a relief valve fluidly connected to the target system and the fluid reservoir, the relief valve configured for movement between a first valve position and at least a second valve position, wherein in the first valve position the relief valve is inactive and fluid is directed to the communication port, wherein in the second valve position the relief valve is active and fluid is directed from the communication port to the fluid reservoir within the housing, and wherein the inlet of the hydraulic pump is connected by a flow path to the relief valve;
- at least one metering orifice for metering fluid to the fluid reservoir within the housing, and wherein, during operation of the hydraulic pump in a reverse direction, the at least one metering orifice is configured to meter fluid to the fluid reservoir, wherein the hydraulic pump is configured for rotation in a forward direction and in the reverse direction, wherein, during operation of the hydraulic pump in the reverse direction, fluid from the inlet of the hydraulic pump is directed to move the relief valve to the second valve position to be active such that the hydraulic-mechatronic system limits delivery of fluid through the communication port and instead directs fluid flow into the fluid reservoir of the housing, and wherein the at least one metering orifice comprises a metering orifice connected to the flow path between the hydraulic pump and the relief valve and connected to the fluid reservoir to: (1) limit flow back to the fluid reservoir from the hydraulic pump when running in the reverse direction to build-up pressure to push the relief valve to the second valve position and (2) enable the hydraulic pump running in the forward direction to draw fluid from the fluid reservoir.

2. The hydraulic-mechatronic system according to claim 1, wherein the at least one check valve comprises a first check valve and a second check valve for selectively providing communication between the fluid reservoir and the hydraulic pump, wherein, during operation of the hydraulic pump in the forward direction, the first check valve is configured to block flow from the outlet of the hydraulic pump to the fluid reservoir and the second check valve is configured to allow fluid flow from the fluid reservoir into the inlet of the hydraulic pump, and wherein, during operation of the hydraulic pump in the reverse direction, the first check valve is configured to allow fluid flow from the fluid reservoir to the outlet of the hydraulic pump and the second check valve is configured to block fluid flow from the inlet of the hydraulic pump and instead direct fluid flow to the relief valve.

3. The hydraulic-mechatronic system according to claim 1, wherein the at least one metering orifice comprises a first metering orifice and a second metering orifice, the first metering orifice being said metering orifice connected to the flow path between the hydraulic pump and the relief valve and connected to the fluid reservoir, and the second metering orifice being configured to restrict fluid flow from the target system into the fluid reservoir.

4. The hydraulic-mechatronic system according to claim 1, further comprising an outlet check valve in an outlet path that is connected to the outlet of the hydraulic pump and the communication port, the outlet check valve configured to block fluid from the outlet path to the outlet of the pump, but permit fluid flow from the outlet of the pump to the outlet path, such that during operation of the hydraulic pump in the forward direction, the outlet check valve permits flow to the outlet path and the communication port.

5. The hydraulic-mechatronic system according to claim 1, further comprising a controller that is contained in the housing yet separated from the fluid in the fluid reservoir by way of a seal.

6. The hydraulic-mechatronic system according to claim 1, wherein the at least one metering orifice comprises a fixed metering orifice.

7. The hydraulic-mechatronic system according to claim 1, further comprising a volume compensation device within the housing, for pre-pressurizing the fluid reservoir and for providing volume compensation of the hydraulic-mechatronic system.

8. The hydraulic-mechatronic system according to claim 7, wherein the hydraulic-mechatronic system is a closed system such that the housing encloses and contains the hydraulic pump, the volume compensation device, the electric motor, the at least one check valve, the at least one metering orifice, and relief valve therein.

9. A method of operating the hydraulic-mechatronic system of claim 1, the method comprising:
- selectively rotating the hydraulic pump in the forward direction, thereby
  - feeding fluid from the fluid reservoir into the inlet of the hydraulic pump for pressurization;
  - blocking with the relief valve fluid communication to the fluid reservoir; and
  - outputting pressurized fluid from the hydraulic pump through the outlet to the communication port and thus to the target system; and
- selectively rotating the hydraulic pump in the reverse direction, thereby
  - feeding fluid from the fluid reservoir into the outlet of the hydraulic pump;
  - limiting delivery of fluid through the communication port;
  - metering fluid to the fluid reservoir within the housing using the at least one metering orifice, and
  - directing fluid flow from the communication port into the fluid reservoir via the relief valve.

10. The method according to claim 9, wherein the selectively rotating the hydraulic pump in the forward direction includes limiting fluid flow from the hydraulic pump to the fluid reservoir.

11. The method according to claim 10, further comprising allowing fluid flow from the fluid reservoir into the inlet of the hydraulic pump during the rotating of the hydraulic pump in the forward direction.

12. The method according to claim 9, wherein the selectively rotating the hydraulic pump in the reverse direction includes allowing fluid flow from the fluid reservoir to the outlet of the hydraulic pump and blocking fluid flow from the inlet of the hydraulic pump and instead directing fluid flow to the relief valve.

13. The method according to claim 12, further comprising restricting flow into the reservoir during operation of the hydraulic pump in the reverse direction.

14. The method according to claim 9, wherein the hydraulic-mechatronic system further comprises a volume compensation device within the housing, for pre-pressurizing the fluid reservoir and for providing volume compensation of the hydraulic-mechatronic system, and wherein the method further comprises: expanding the volume compensation device during rotation in the forward direction for providing volume compensation and pre-pressurization within the fluid reservoir.

15. The method according to claim 9, wherein the at least one metering orifice comprises a fixed metering orifice.

16. A hydraulic-mechatronic system for a vehicle that is connected to a target system, the hydraulic-mechatronic system comprising:
a housing comprising a fluid reservoir for containing fluid therein;
a communication port provided on the housing for fluid communication with the target system to and from the fluid reservoir;
the housing further containing:
a hydraulic pump having an inlet and an outlet, the inlet for receiving input fluid from the fluid reservoir and the outlet for providing pressurized fluid to the communication port;
an electric motor for driving the hydraulic pump;
a first check valve and a second check valve for selectively providing communication between the fluid reservoir and the hydraulic pump;
a relief valve fluidly connected to the target system and the fluid reservoir, the relief valve configured for movement between a first valve position and at least a second valve position, wherein in the first valve position the relief valve is inactive and fluid is directed to the communication port, wherein in the second valve position the relief valve is active and fluid is directed from the communication port to the fluid reservoir within the housing, and wherein the inlet of the hydraulic pump is connected by a flow path to the relief valve; and
at least one metering orifice for metering fluid to the fluid reservoir within the housing, and wherein, during operation of the hydraulic pump in a reverse direction, the at least one metering orifice is configured to meter fluid to the fluid reservoir,
wherein the hydraulic pump is configured for rotation in a forward direction and in the reverse direction,
wherein, during operation of the hydraulic pump in the forward direction, the first check valve is configured to block flow from the outlet of the hydraulic pump to the fluid reservoir and the second check valve is configured to allow fluid flow from the fluid reservoir into the inlet of the hydraulic pump, and
wherein, during operation of the hydraulic pump in the reverse direction, (a) the first check valve is configured to allow fluid flow from the fluid reservoir to the outlet of the hydraulic pump and the second check valve is configured to block fluid flow from the inlet of the hydraulic pump and instead direct fluid flow to the relief valve and (b) fluid from the inlet is directed to move the relief valve to the second valve position to be active such that the hydraulic-mechatronic system limits delivery of fluid through the communication port and instead directs fluid flow into the fluid reservoir of the housing, and wherein the at least one metering orifice comprises a metering orifice connected to the flow path between the hydraulic pump and the relief valve and connected to the fluid reservoir to: (1) limit flow back to the fluid reservoir from the hydraulic pump when running in the reverse direction to build-up pressure to push the relief valve to the second valve position and (2) enable the hydraulic pump running in the forward direction to draw fluid from the fluid reservoir.

17. The hydraulic-mechatronic system according to claim 16, wherein the at least one metering orifice comprises a first metering orifice and a second metering orifice, the first metering orifice being said metering orifice connected to the flow path between the hydraulic pump and the relief valve and connected to the fluid reservoir, and the second metering orifice being configured to restrict fluid flow from the target system into the fluid reservoir.

18. The hydraulic-mechatronic system according to claim 16, wherein the at least one metering orifice comprises a fixed metering orifice.

19. The hydraulic-mechatronic system according to claim 16, further comprising a volume compensation device within the housing, for pre-pressurizing the fluid reservoir and for providing volume compensation of the hydraulic-mechatronic system.

20. A method of operating a hydraulic-mechatronic system for a vehicle that is connected to a target system, the hydraulic-mechatronic system comprising:
a housing comprising a fluid reservoir for containing fluid therein;
a communication port provided on the housing for fluid communication with the target system to and from the fluid reservoir;
the housing further containing:
a hydraulic pump having an inlet and an outlet, the inlet for receiving input fluid from the fluid reservoir and the outlet for providing pressurized fluid to the communication port;
an electric motor for driving the hydraulic pump;
at least one check valve for selectively providing communication between the fluid reservoir and the hydraulic pump;
a relief valve fluidly connected to the target system and the fluid reservoir, the relief valve configured for movement between a first valve position and at least a second valve position, wherein in the first valve position the relief valve is inactive and fluid is directed to the communication port, wherein in the second valve position the relief valve is active and fluid is directed from the communication port to the fluid reservoir within the housing;
at least one metering orifice for metering fluid to the fluid reservoir within the housing, and wherein, during operation of the hydraulic pump in a reverse direction, the at least one metering orifice is configured to meter fluid to the fluid reservoir,
wherein the hydraulic pump is configured for rotation in a forward direction and in the reverse direction,
wherein, during operation of the hydraulic pump in the reverse direction, the relief valve is active such that the hydraulic-mechatronic system limits delivery of fluid through the communication port and instead directs fluid flow into the fluid reservoir of the housing;
the method comprising:
selectively rotating the hydraulic pump in the forward direction, thereby feeding fluid from the fluid reservoir into the inlet of the hydraulic pump for pressurization;

blocking with the relief valve fluid communication to the fluid reservoir; and outputting pressurized fluid from the hydraulic pump through the outlet to the communication port and thus to the target system;

and selectively rotating the hydraulic pump in the reverse direction, thereby feeding fluid from the fluid reservoir into the outlet of the hydraulic pump;

limiting delivery of fluid through the communication port;

metering fluid to the fluid reservoir within the housing using the at least one metering orifice, and directing fluid flow from the communication port into the fluid reservoir via the relief valve.

* * * * *